H. W. FROHNE.
INSTRUMENT FOR REPRODUCTION OF PICTURES, &c.
APPLICATION FILED JAN. 13, 1908.
920,450.
Patented May 4, 1909.
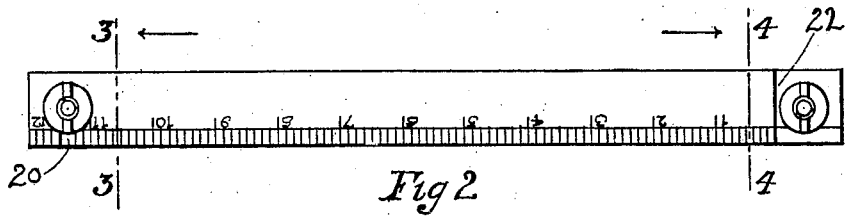
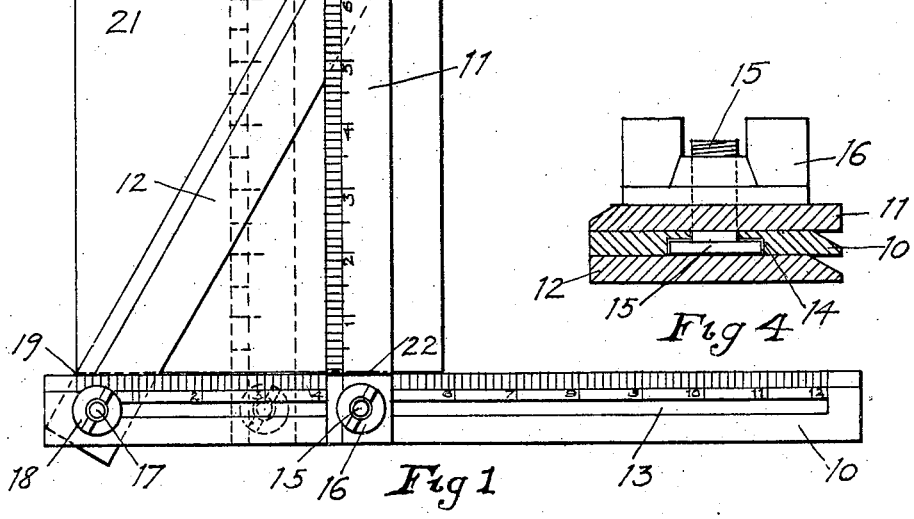
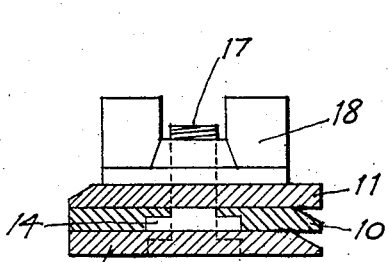
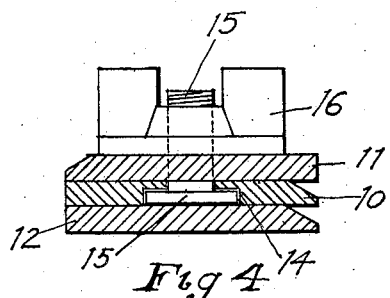
WITNESSES:
INVENTOR
Henry W. Frohne
BY
Chas. E. Gill
ATTORNEY

UNITED STATES PATENT OFFICE.

HENRY W. FROHNE, OF NEW YORK, N. Y.

INSTRUMENT FOR REPRODUCTION OF PICTURES, &c.

No. 920,450.     Specification of Letters Patent.     Patented May 4, 1909.

Application filed January 13, 1908. Serial No. 410,479.

*To all whom it may concern:*

Be it known that I, HENRY W. FROHNE, a citizen of the United States, and a resident of New York city, in the county of New York and State of New York, have invented certain new and useful Improvements in instruments for determining whether pictures and the like may be reproduced on a proportionally reduced or enlarged scale to suitably occupy fixed areas or spaces intended for them on printed sheets, of which the following is a specification.

The invention relates to improvements in instruments for determining whether pictures and the like may be reproduced on a proportionally reduced or enlarged scale to suitably occupy fixed areas or spaces intended for them on printed sheets, and it consists, more particularly in an instrument, hereinafter described and claimed, for enabling publishers, engravers and illustrators to quickly and accurately determine whether the subject of a photograph, drawing or other illustration may be proportionally enlarged or reduced to the fixed dimensions of a space on the page of a magazine or elsewhere within which it may be desired to reproduce the same by printing from half-tone plates or other process.

A publisher having a given space on a page to receive an illustration will necessarily know that the picture (any picture) can be reduced or enlarged, as the case may be, in respect of either its height or width to the height or width of such space but he cannot determine without calculation or means of ascertainment whether the picture may be proportionally reduced or enlarged to fit both the height and width of his space. For instance, a publisher having a space four inches high and two and one-half inches wide to receive a reproduction cannot know without calculation or proper means of ascertainment whether a picture if proportionally reduced or enlarged to four inches in height will be suitable to the two and one-half inch width of his space or if reduced or enlarged to two and one-half inches in width will be suitable for the four inch height of his space.

The object of the invention is to provide a simple, convenient and efficient instrument for enabling a publisher or other person to instantly determine whether a picture or the like may be proportionally reduced or enlarged to suit both the height and width of a given space or outline.

A further object of the invention is to so construct the instrument that its parts may be folded together into convenient form to be carried in the pocket.

The invention will be fully understood from the detailed description hereinafter presented, reference being had to the accompanying drawings, in which:

Figure 1 is a top elevation of an instrument embodying my invention shown applied to a diagrammatically indicated photograph with the view of determining whether the same may be reproduced on a proportionally reduced or enlarged scale to suitably occupy a given space provided or left to receive it; Fig. 2 is an elevation of the instrument in its folded condition; Fig. 3 is a transverse section of the same on the dotted line 3—3 of Fig. 2, and Fig. 4 is a transverse section of the same on the dotted line 4—4 of Fig. 2.

The instrument comprises three main parts or blades numbered, respectively, 10, 11 and 12, the blade 10 being a graduated scale formed with a vertical longitudinal slot 13 whose lower portion is widened, as at 14, to create a guide and bearing surfaces for the head of a screw 15, and the blade 11 being a graduated scale apertured at its lower end passing upon the screw 15 and connected to the blade 10 by means of said screw and a thump-nut 16 applied thereto. The blade 12 does not require to be graduated and it is connected at its lower end to one end of the blade 10 by means of a screw 17 and thumb-nut 18, said screw 17 having its head seated within a socket formed in the lower surface of said blade 12, as indicated by dotted lines in Fig. 3, while the shank of the screw extends upwardly through said blade 12 and thence upwardly through the slot 13 of the blade 10 and has applied upon its upper end the thumb-nut 18. The blade 12, by reason of its use hereinafter explained, may be designated as a diagonal blade and it extends at an angle below the blades 10, 11 and is entirely free of the blade 11, having no direct connection therewith. The lower side of the blade 11 is upon the upper side of the blade 10.

The heads of the screws 15, 17 are square in horizontal outline to prevent the rotation of the screws, but the shanks of the screws are round and hence upon the loosening of the thumb-nuts 16, 18, the blades 11, 12 may have a pivotal movement to any extent desired. When the thumb-nut 16 is loosened the blade 11 may be adjusted to any required position along the slot 13 and blade 10, and when the nut 18 is loosened the blade 12 may be given any required inclined or diagonal position and whenever necessary adjusted by the movement of the screw 17 in its end of the slot 13 sufficiently to bring the upper or left hand edge of said blade in line with the zero mark, denoted at 19, on the blade 10.

The adjustment of the blade 12 by the movement of the screw 17 along the slot 13 is of importance since thereby the instrument is adapted to rectangular pictures varying greatly in their outlines. In the employment of the instrument the operative edge of the blade 12 and the lower left hand corner of the picture 21 must be at the zero mark 19 of the blade 10, and since said edge of said blade will assume various positions with relation to said zero mark as said blade is inclined with respect to the shapes of the pictures to which the instrument may be applied, I provide for the adjustment of the blade 12 longitudinally of the blade 10, by means of the slot 13, screw 17 and nut 18, so that in whatever inclination the blade 12 may be placed its lower end may be adjusted to bring the operative edge of the blade in line with the zero mark 19.

The upper end of the blade 11 is formed with a notch 20 which is not used except in the folding of the blades 10, 11, 12 together in the condition shown in Figs. 2, 3 and 4 and which is accomplished by moving the screw 15 to the right hand end of the slot 13 and turning the blade down and toward the left until it is upon the blade 10, the nut 18 having previously been screwed upwardly so that the notch 20 may pass upon the screw 17. After the blade 11 has been folded upon the blade 10 with the notch 20 engaging the screw 17, it may be locked in such position by tightening the nut 18 upon it. While the nut 18 is loosened the blade 12 will be folded down toward the right until it is directly below the blade 10. It is of very great advantage to be able to fold the blades 10, 11, 12 upon one another, since the instrument when in such condition may be conveniently carried in the pocket or placed away and will be in no danger of becoming destroyed or broken.

In Fig. 1 I have shown the instrument as applied to a diagrammatically represented photograph 21 for the purpose of illustrating the method of determining the height a proportionally reduced reproduction thereof would have if its width had to be two and one-half inches in order to meet the width of the space on a printed sheet. A publisher having a space two and one-half inches wide on a sheet to receive a picture, will know or may readily ascertain the height of the space, but he cannot know without careful calculation or suitable means of ascertainment, whether a reproduction from a photograph proportionally reduced to a two and one-half inch width will in height be suitable for the space on the sheet. In the use of the instrument to determine what would be the height of the picture if proportionally reduced to a two and one-half inch width, the publisher or illustrator will place the instrument upon the photograph 21 in the manner indicated in Fig. 1, the lower edge of the photograph being in line with the upper edge of the blade 10 and the lower left hand corner of the photograph at the zero point 19 on said blade. Thereupon he will turn the blade 12 until its outer edge extends diagonally from the lower left hand corner to the upper right hand corner of the photograph, as shown, and then adjust the blade 11 along the slot 13 until the graduated edge thereof reaches the two and one-half inch mark on the blade 10, as indicated by the dotted lines in Fig. 1. The blade 11 is moved to the two and one-half inch mark on the blade 10, because it is known that the proportional reduction of the photograph must fit a two and one-half inch wide space on the printed sheet. The height of the proportionally reduced photograph to a two and one-half inch width will be given on the blade 11 at the exact point where its graduated edge crosses the outer edge of the blade 12, which in the present instance would indicate four and one-half inches, thus showing that a reproduction of the photograph proportionally reduced to a two and one-half inch width would require a space four and one-half inches high. In every instance if the publisher or illustrator calculates from the width of the space provided to receive the picture, he will adjust the blade 11 along the blade 10 to a point denoting such width and always cause the blade 12 to extend diagonally from corner to corner of the picture. The height required for the picture if proportionally reduced to the width given on the blade 10, will always be indicated at the point where the graduated edge of the blade 11 crosses the outer edge of the blade 12.

In Fig. 1 I illustrate the method of determining the height a reproduction of the photograph would have on a proportional reduction to a two and one-half inch width, and the same instrument may be employed in the same manner to determine what would be the height of the picture if proportionally enlarged to a width beyond its natural size. In determining this height, on an enlargement, the blade 12 would be caused to extend diagonally from corner to corner of the picture or photograph and the blade 11 adjusted toward the right beyond the right hand edge of the picture in accordance with the given width to which the picture is to be enlarged. The height of the enlargement will always be denoted on the blade 11 at the point where its graduated edge crosses the outer edge of the blade 12.

It has been explained how the instrument may be used for determining the height a reproduction of a picture either on a proportional reduction or enlargement to a predetermined width, will present. The same instrument may, however, be used to determine the width a reproduction, either reduced or enlarged, will have on a calculation made from the height (in lieu of the width) of the fixed space to receive the same. If, for illustration, the picture on its reproduction had to be reduced to a height of four and one-half inches, it would be desired to ascertain what the width of the thus reduced picture will be, and the instrument having been applied to the picture as shown in full lines in Fig. 1, the blade 11 would be moved to the left until the four and one-half inch mark on its graduated edge reached the outer edge of the blade 12. The width of the picture thus reduced to a four and one-half inch height would be given on the blade 10, and as denoted by the dotted position of the blade 11, would be two and one-half inches. On an enlargement the blade 11 would be moved outwardly along the blade 10 until the proper graduation mark on its edge coincided with the edge of the blade 12, and the width of the enlargement would be denoted on the blade 10 at the edge of the blade 11. Thus a publisher knowing either the width or height to which a picture must be proportionally reduced or enlarged to suitably occupy a space can, by means of the instrument, determine the other dimension (width or height) the picture will present when reduced or enlarged, and he may thereby accurately and quickly ascertain whether the reduced or enlarged picture will have appropriate dimensions in both directions for the space intended to receive it.

The blade 11 is provided at right angles to its length with a guide-line 22 which serves as an aid to the operator in placing the blade 11 at a right angle to the blade 10, said line 22 when said blades are at a right angle to each other appearing in line with the graduated edge of the blade 10.

What I claim as my invention and desire to secure by Letters-Patent, is:

1. In an instrument of the character described, a horizontal graduated and longitudinally slotted blade 10, a vertical graduated blade 11 having its lower end crossing said blade 10, a screw extended through the slot of the blade 10 and the blade 11 and provided with a thumb-nut, a diagonal blade 12 adapted to extend diagonally from corner to corner of a picture regardless of the position of the blade 11 and being free thereof, and a screw passing through the lower end of said blade 12 and the blade 10 and having a thumb-nut thereon, said blades 10, 11 being adapted by their graduations to respectively denote the width and height a proportionally reduced or enlarged reproduction of a picture will have when the blade 12 is extended diagonally from corner to corner across the picture and the blade 11 is moved to cross said blade 12, and the slot in said blade 10 being widened at its lower portion to receive and afford a guide for the head of the screw of the blade 11; substantially as set forth.

2. In an instrument of the character described, a horizontal graduated and longitudinally slotted blade 10, a vertical graduated blade 11 having its lower end crossing said blade 10, a screw extended through the slot of the blade 10 and the blade 11 and provided with a thumb-nut, a diagonal blade 12 adapted to extend diagonally from corner to corner of a picture regardless of the position of the blade 11 and being free thereof, and a screw passing through the lower end of said blade 12 and the blade 10 and having a thumb-nut thereon, said blades 10, 11 being adapted by their graduations to respectively denote the width and height a proportionally reduced or enlarged reproduction of a picture will have when the blade 12 is extended diagonally from corner to corner across the picture and the blade. 11 is moved to cross said blade 12, and the screw for the blade 12 being adjustable longitudinally of the blade 10 for bringing the operative edge of the blade 12, in the various inclinations of the latter, in line with the zero mark on the blade 10, whereby the instrument becomes adapted to pictures varying in rectangular shapes; substantially as set forth.

Signed at the city of New York, in the county and State of New York, this 11th day of January, 1908.

HENRY W. FROHNE.

Witnesses:
 Chas. C. Gill,
 Arthur Marion.